US010650811B2

(12) United States Patent
Ediz et al.

(10) Patent No.: US 10,650,811 B2
(45) Date of Patent: May 12, 2020

(54) CORRECTION OF SPEECH RECOGNITION ON REPETITIVE QUERIES

(71) Applicant: Microsoft Technology Licensing, LLC, Redmond, WA (US)

(72) Inventors: Meryem Pinar Donmez Ediz, Redmond, WA (US); Ranjitha Gurunath Kulkarni, Sunnyvale, CA (US); Shuangyu Chang, Redmond, WA (US); Nitin Kamra, Los Angeles, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

(21) Appl. No.: 15/920,231

(22) Filed: Mar. 13, 2018

(65) Prior Publication Data

US 2019/0287519 A1 Sep. 19, 2019

(51) Int. Cl.
*G10L 15/00* (2013.01)
*G10L 15/197* (2013.01)
*G10L 15/22* (2006.01)
*G10L 15/01* (2013.01)
*G10L 15/07* (2013.01)
*G10L 15/18* (2013.01)
*G10L 15/183* (2013.01)

(52) U.S. Cl.
CPC ............ *G10L 15/197* (2013.01); *G10L 15/01* (2013.01); *G10L 15/07* (2013.01); *G10L 15/183* (2013.01); *G10L 15/1815* (2013.01); *G10L 15/22* (2013.01); *G10L 15/1822* (2013.01); *G10L 2015/223* (2013.01)

(58) Field of Classification Search
CPC combination set(s) only.
See application file for complete search history.

(56) References Cited

U.S. PATENT DOCUMENTS

| 8,645,138 B1* | 2/2014 | Weinstein | G10L 15/19 704/231 |
| 9,336,772 B1* | 5/2016 | Salvador | G10L 15/183 |
| 2014/0297267 A1* | 10/2014 | Spencer | G06F 17/276 704/9 |

OTHER PUBLICATIONS

Cormen, et al., "Introduction to Algorithms", In Publication of MIT Press, Jul. 31, 2009, 1313 Pages.

* cited by examiner

*Primary Examiner* — Vu B Hang
(74) *Attorney, Agent, or Firm* — Schwegman Lundberg & Woessner, P.A.

(57) ABSTRACT

Disclosed in various examples are methods, systems, and machine-readable mediums for providing improved computer implemented speech recognition by detecting and correcting speech recognition errors during a speech session. The system recognizes repeated speech commands from a user in a speech session that are similar or identical to each other. To correct these repeated errors, the system creates a customized language model that is then utilized by the language modeler to produce a refined prediction of the meaning of the repeated speech commands. The custom language model may comprise clusters of similar past predictions of speech commands from the speech session of the user.

20 Claims, 6 Drawing Sheets

CORRECTION OF SPEECH RECOGNITION ON REPETITIVE QUERIES

BACKGROUND

Computer-implemented speech recognition processing has become increasingly more accurate. A speech recognition processor takes as input a digital representation of a person's voice and determines its intended meaning. For example, a computer may record a user's voice, run the voice recording through the speech recognition processor to determine an intended meaning and take an action based upon that intended meaning.

These speech recognition processors are useful in a variety of applications. One such application is that of computerized virtual assistants. By utilizing voice input, the computerized virtual assistants free the hands and eyes of the user for other tasks and are more intuitive as they are more akin to the natural human interactions that people are used to. The computerized assistants may perform various actions in response to user input such as running search queries on search engines, ordering products, conversing with the user, providing information to the user, and other functions.

Other applications for computer-implemented speech recognition are also gaining in popularity as the accuracy of the speech recognition increases. Example applications include dictation programs where the user's spoken words are converted to an electronic text document. Some other applications include programs for the disabled that automatically generate closed-captioned text for videos, and the like.

SUMMARY

Embodiments pertain to computer-implemented speech recognition. Some embodiments relate to improvements to the accuracy of computer-implemented speech recognition. In an example, a speech recognition system uses unsupervised learning techniques to detect speech recognition errors by a speech recognition processor by recognizing repeated speech commands from a user in a session that are similar or identical to each other. These repeated commands indicate that the user is likely retrying the speech command because the speech recognition processor is not recognizing the command properly. To correct these repeated errors, the speech recognition system may create a customized language model, different than the normally used universal language model, that is then utilized by a language modeling processor of the speech recognition processor to produce a refined prediction of the meaning of the repeated speech commands. The custom language model may comprise clusters of similar predictions made by the speech recognition processor of meanings of previously issued voice commands that are from the session of the user. The speech recognition system may also supplement the custom language model with search queries issued to a traditional text-based search engine that are similar to the predictions in the cluster.

For example, disclosed is a computing device for speech recognition, the computing device including a processor and a memory, the memory including instructions, when performed by the processor, cause the processor to perform operations comprising retrieving a plurality of ranked predictions of a meaning of one or more speech data segments, the one or more speech data segments provided for a particular session of a particular user of a speech recognition application, clustering the plurality of ranked predictions into one or more clusters based upon a similarity of the ranked predictions, creating a custom language model for at least one cluster of the one or more clusters based upon the ranked predictions in the at least one cluster, applying the custom language model in a language modeling process to produce a second plurality of ranked predictions of a meaning of at least one segment of the one or more speech data segments, and utilizing the second plurality of ranked predictions to cause a response to the particular user within the particular session.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Computer-implemented speech recognition processors have become more accurate, but are still not as accurate as human speech recognition. One persistent issue for existing speech recognition processors is that they do not adequately recognize and learn from their mistakes. For example, a speech recognition processor may wrongly interpret a speech command, which causes the user to repeat the same speech command. The speech recognition processor may continue to misunderstand the command as it does not recognize that the repeated command is an attempt by the user to retry the request after a failed interpretation. Other signals of error may include a user failing to interact with the presented results, a user giving up on voice commands and inputting a similar text query into a search engine, and the like. Even if the speech recognition processor recognizes the error, the speech recognition processor may not be able to change its behavior to obtain a different result.

Disclosed in various examples are methods, systems, and machine-readable mediums for providing improved computer implemented speech recognition systems by detecting and correcting speech recognition errors during a speech session. The speech recognition system uses unsupervised learning techniques to detect speech recognition errors by recognizing repeated speech commands from a user in a session that are similar or identical to each other. These repeated commands indicate that the user is likely retrying the speech command because the speech recognition processor is not recognizing the command properly. To correct these repeated errors, a speech recognition system that includes a speech recognition processor creates a customized language model, different than the normally used universal language model, that is then utilized by a language modeling processor of the speech recognition processor to produce a refined prediction of the meaning of the repeated speech commands. The custom language model may comprise clusters of similar predictions made by the speech recognition processor of meanings of previously issued voice commands that are from the session of the user. The speech recognition system may also supplement the custom language model with search queries issued to a traditional text-based search engine that are similar to the predictions in the cluster.

Thus, the system may combine the knowledge obtained from multiple repeated (but possibly slightly differing) versions of a query to produce an improved recognition hypothesis over traditional methods. The improved speech recognition system provides improved accuracy of speech recognition through custom model creation in response to unsupervised learning signals over traditional speech recognition processors. Unsupervised signals are signals that are not manually labeled as correct or incorrect, but nevertheless are utilized to indicate whether the speech recognition processor is interpreting the speech commands of the user properly. The present systems may be considered an unsupervised machine learning approach to improving the accuracy of a speech recognition system.

This solves the technical problems of providing accurate computer-implemented speech recognition by utilizing the technical solution of unsupervised signals (and other signals) to recognize repeated errors and by building a customized language model that utilizes the predictions for those repeated errors as well as other information extrapolated from those predictions to focus the recognition on more relevant hypothesis. This results in a commensurate improvement in the operation of an accompanying voice or graphical user interface, and benefits in improved (e.g., more efficient, reduced) processing operations, resource utilization (e.g., memory, bandwidth, processing cycles), and user experience (e.g., increased efficiency, improved interaction performance). For example, by more accurately determining what the user is commanding, the system may prevent the user from having to revert to text or other forms of input—which may be resource intensive and distracting.

As stated, the speech recognition system may detect speech recognition errors based upon detecting multiple voice commands that are the same or similar. In some examples, these repeated commands may be identified by detecting a similarity in predictions generated by the speech recognition processor for different voice commands during a particular speech recognition session. In some examples, in addition to detecting repeated commands, other signals that indicate whether the speech recognition system is wrong may also be utilized. For example, a failure of the user to interact with results, using text-based search engines for similar queries, and the like may be indicative of a failure of the voice recognition processor to accurately determine the user's command.

Figure 1:
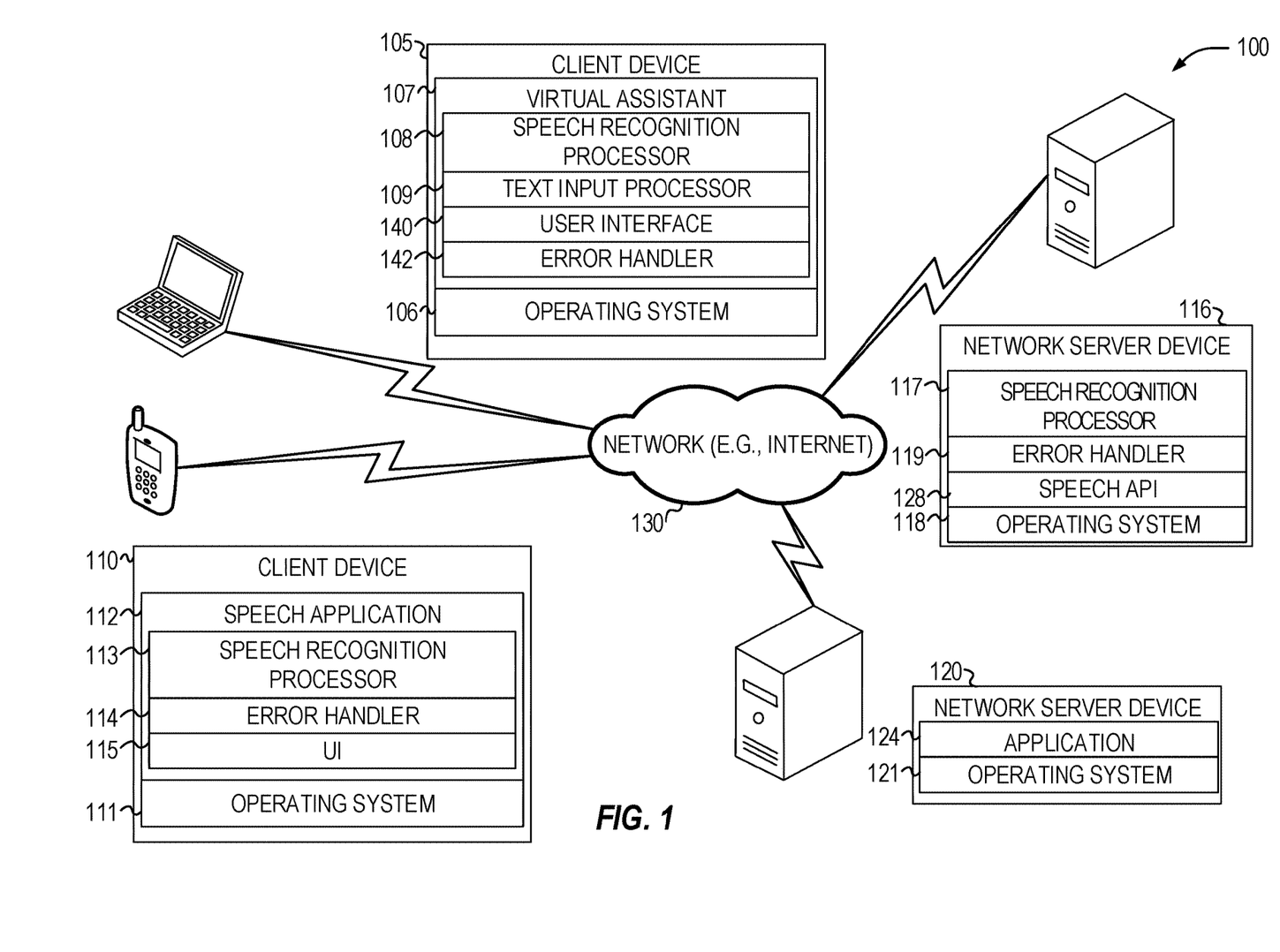
FIG. 1 illustrates a schematic of an example speech recognition environment according to some examples of the present disclosure.

FIG. 1 illustrates a schematic of an example speech recognition environment 100 according to some examples of the present disclosure. A first client computing device 105, a second client computing device 110, a first network server computing device 116, and a second network server computing device 120 may communicate using computer network 130. Computer network 130 may be, or include, a Wide Area Network (WAN), Local Area Network (LAN), Metropolitan Area Network (MAN), be the internet, intranet, or the like. As shown in FIG. 1, first client computing device 105 is a laptop and second client computing device 110 is a smartphone, but one of ordinary skill in the art with the benefit of the present disclosure will appreciate that the client computing devices may be any computing device such as a laptop, smartphone, tablet, desktop, server, a smart speaker, or other computing device. In some examples, a smart speaker may be a low-cost device that has a speaker, microphone, network interface, and limited processing and memory capability that may record a user's speech, send it to a network server computing device (such as network server computing device 116) for processing, and play audio responses returned by the network server computing device. Examples may include Amazon Echo®, Harmon Kardon Invoke®, voice activated remote controls, and the like.

Figure 5:
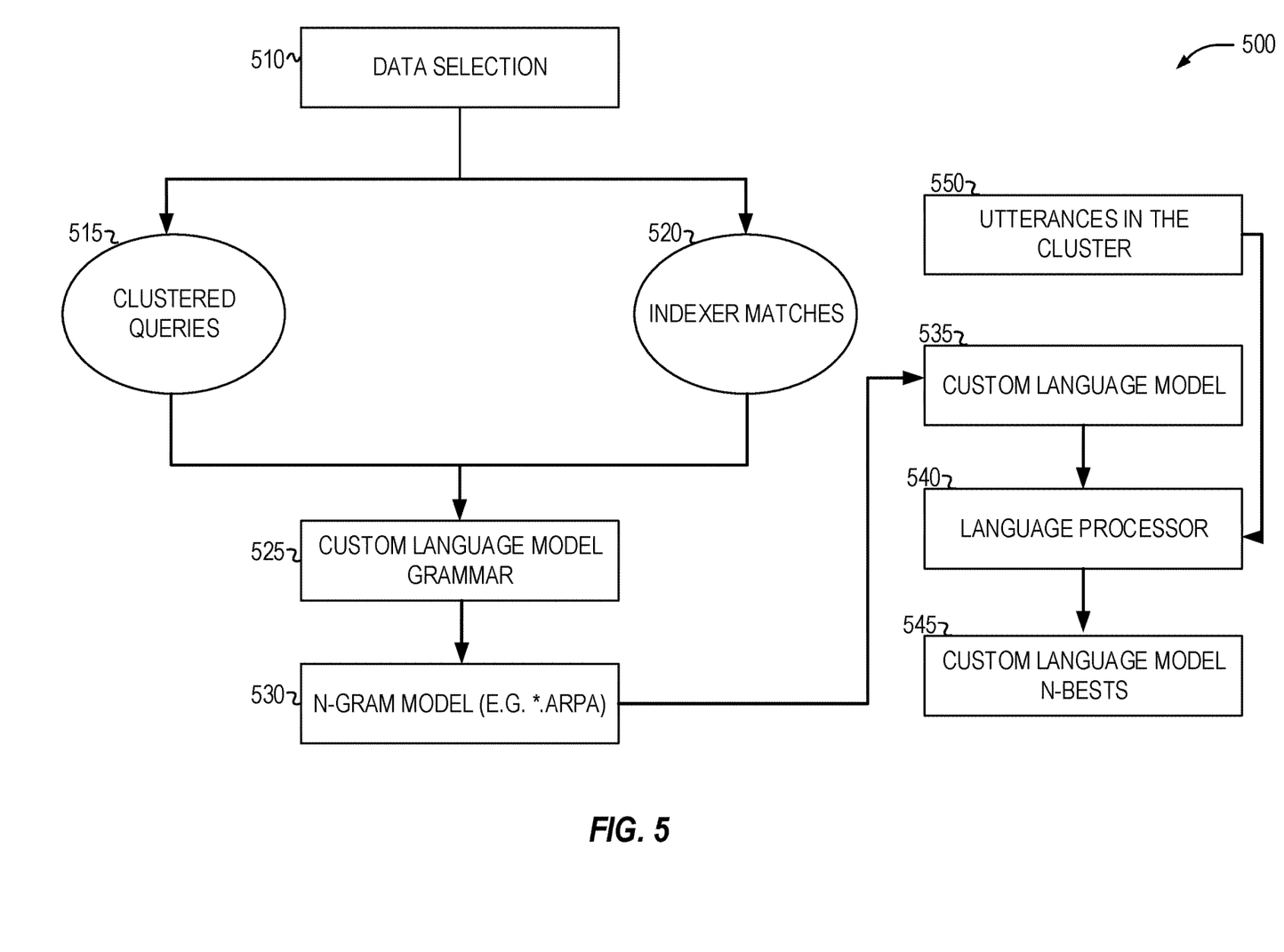
FIG. 5 illustrates a diagram of creating a custom language model, according to some examples of the present disclosure.

A computing device (such as first and second client computing devices 105, 110, and first and second network server computing devices 116 and 120) is described in more detail in FIG. 5. First client computing device 105, second client computing device 110, first network server computing device 116, and second network server computing device 120 may access the computer network 130 through a variety of wired and wireless means, such as wired Ethernet, Wireless LAN (WLAN), Cellular, and the like. First client computing device 105, second client device 110, first network server computing device 116, and second network server computing device 120 may include respective operating systems 106, 111, 118, and 121. The operating systems 106, 111, 118, and 121 may provide various services to other applications executing on the computing devices. Example services provided by the operating systems 106, 111, 118, and 121 include one or more of: providing an interface to these applications to access hardware of the computing device (e.g., such as by providing an Application Programming Interface (API)), providing memory management services, scheduling processes, scheduling threads, providing graphical user interface (GUI) functionalities, database functionality (e.g., a registry), event interrupts, inter-process communications, and the like.

Figure 2:
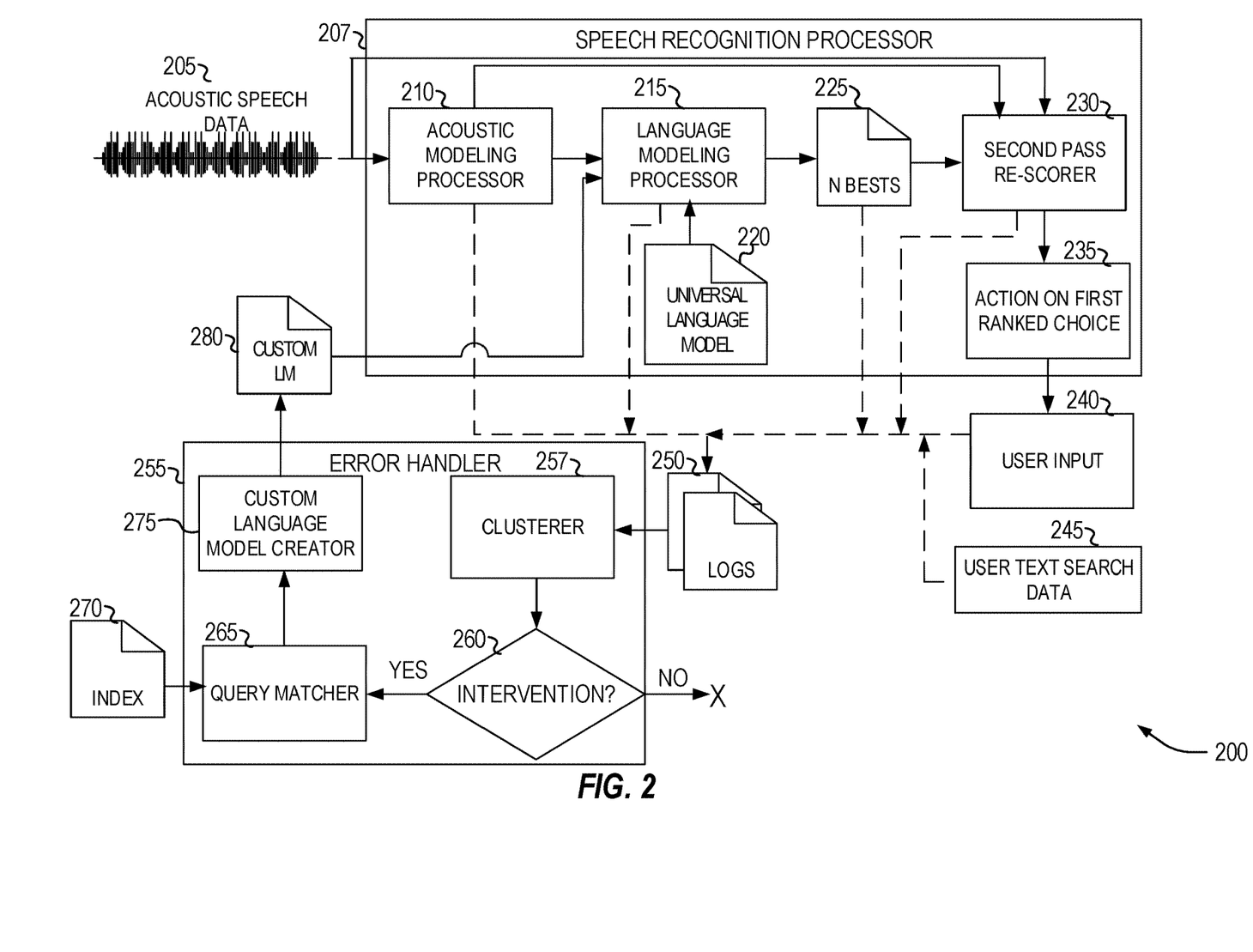
FIG. 2 illustrates a speech recognition system according to some examples of the present disclosure.

First client computing device 105 may include a virtual assistant 107. A virtual assistant is a software application that performs tasks for a user. Example virtual assistants include Microsoft Cortana®, Apple Siri®, Google Assistant®, and Amazon Alexa®. These virtual assistants may include one or more ways for users to interact with the virtual assistant, such as by text, voice, data files (e.g., uploading images or other files), and the like. As shown in FIG. 1, the virtual assistant 107 may include a speech recognition processor 108. The speech recognition processor 108 may be a fully self-contained speech recognition processor that receives speech input, processes the speech to determine a meaning, selects an action to take in response to the determined meaning, and performs the action. In other examples, the speech recognition processor 108 may work with a speech recognition processor 117 on a first network server computing device 116. For example, the speech recognition processor 108 may receive the user's speech, and may transmit it to the speech recognition processor 117 over computer network 130. Speech recognition processor 117 may then process the speech to determine a meaning, select an action, and execute the action. In some examples, the speech recognition processor 108 may partially process the received speech. More details about how the speech recognition processor 108 and 117 function is shown in FIG. 2.

Virtual assistant 107 may include a text input processor 109 which may receive one or more text inputs from users. Example text inputs include questions, commands, searches, and other tasks. The text input processor 109 and speech recognition processor 108 may share one or more components. For example, speech recognition processor 108 and text input processor 109 may both share a semantic model that converts the text or speech into actionable commands— for example, a natural language processing (NLP) model. In some examples, this NLP model may reside at the first network's server device 116. Thus, the text input processor 109 may send the text input to the first network server device 116 for processing.

A user interface (UI) 140 may provide one or more GUIs, audio user interfaces (e.g., the virtual assistant may talk or speak to the user, text user interfaces, and the like for the virtual assistant 107. UI 140 may present one or more results of actions taken as a result of a user input. For example, if a user asks the virtual assistant 107 what movies are showing nearby, the UI 140 may present (e.g., visually or audibly) the movies showing nearby to the user. Other example actions include presenting a weather report, scheduling a task or reminder, calling another person, playing a song, launching an application, ordering a product, setting a navigation destination, and the like.

Error handler 142 of virtual assistant 107 and/or error handler 119 of first network server device 116 may monitor for speech recognition errors during one or more sessions of the virtual assistant by interfacing with the speech recognition processor 108. For example, the error handler 119 and/or 142 may monitor logs of the user's session for errors such as detecting the same or similar repeated commands as evidenced by similar predictions for multiple different received speech commands. If an error is detected, the error handler 119 and/or 142 may take action to correct the errors include creating one or more custom language models for reprocessing of the speech segment involved in the error. As used herein, the speech processing system may comprise the speech recognition processor (108, and/or 117) and the error handler (142 and/or 119).

As previously described, one signal that may be used to indicate whether a speech recognition error has occurred is a repeated voice command. Additionally, or instead, other signals may be utilized to detect speech recognition errors. For example, a lack of activity by the user in response to the action (e.g., a lack of clicks on presented search results), a subsequent text-based search (that is similar to the speech command), and the like. In some examples, the presence of a single signal may trigger the action of the error handler. In other examples, certain types of error signals may trigger remediation processes by the error handler 142 and certain types of signals may trigger remediation action of the error handler 142 only in combination with the presence of other signal types, or only when a threshold has been met. For example, if the error handler 142 determines that a threshold number of successive sets of n-bests for different speech segments are within a threshold comparison distance, the error handler 142 may attempt remediation actions.

As noted, the virtual assistant 107 may perform a certain action in response to a user input, such as a speech or text input. These actions may include queries to other network server computing devices, such as second network server computing device 120. Examples include search engines, weather services for providing weather, databases storing information, calendar services or applications, task applications, email services, and the like. The virtual assistant 107 may communicate with the application 124 of second network server computing device 120 to request and receive data, execute search queries, and the like to complete the action.

While certain functions of FIG. 1 are shown as taking place at certain locations (e.g., a client computing device, a server computing device, and the like), one of ordinary skill in the art with the benefit of the present disclosure will appreciate that other functionality divisions may exist. For example, the virtual assistant 107 on the client device may be a relatively simple application and a majority of the processing may be implemented on the first network server device 116. For example, the speech or text processing, the interaction with the second network server computer device 120 to process or perform the action, and the like may be performed by the first network server device 116. Additionally, the functionality of the error handler 142 may be performed, in whole, or in part by error handler 119.

While first client computing device 105 may include a virtual assistant 107 with speech recognition processor 108, speech recognition processing may be utilized in other contexts. For example, speech application 112 may be a different application which utilizes speech recognition. Examples may include dictation programs that convert speech into text or other actions, communication applications, car infotainment applications, and the like. As shown in second client computing device 110, a speech application 112 such as a transcription program may include speech recognition processor 113, error handler 114 and a user interface 115. Speech recognition processor 113 may perform the same or similar functions as speech recognition processor 108, error handler 114 may perform the same or similar functions as error handler 142, UI 115 may perform the same or similar functions as UI 140.

Network server device 116 may also include a speech Application Programming Interface component 128. This API component may implement an Application Programming Interface that may provide programmatic access to speech recognition processor 117. For example, the API may specify a mechanism by which an application on a remote device may submit a speech command and the API may specify a format and mechanism for returning the prediction of the meaning of the speech command. In these examples, the network server device 116 may maintain logs of the speech commands for a particular client application and the error handler 119 may correct speech recognition errors for that particular client application when signals indicate a need to correct speech recognition errors.

FIG. 2 illustrates a speech recognition system 200 according to an example of the present disclosure. Speech recognition system 200 includes speech recognition processor 207 which may be an example embodiment of speech recognition processor 108, 113, and/or 117. Speech recognition processor 207 may be implemented in hardware, software, or a combination of hardware and software. As noted in FIG. 1, part or all of the speech recognition processor 207 may be performed locally to where the acoustic speech data 205 was captured, or may be performed remotely (e.g., across a network on a server, such as a first network server computing device 116). The speech recognition system 200 may include an error handler 255 which may be an example embodiment of error handler 142, 114, and/or 119 of FIG. 1.

Acoustic speech data 205 corresponding to one or more speech commands is captured, for example, by a microphone, converted to a digital format, and then passed as input to an acoustic modeling processor 210. The acoustic modeling processor 210 may perform an acoustic modeling process that takes the acoustic speech data 205 and outputs a sequence of phonemes that the acoustic modeling processor 210 estimates is a representation of speech in the acoustic speech data 205. The acoustic modeling processor 210 may utilize an acoustic model (not shown) that may comprise statistical representations of each possible distinct sound that makes up a word in a given language. The acoustic modeling processor 210 may keep track of the matching phonemes the acoustic modeling processor 210 detects and output the matching phonemes. Example implementations of the acoustic modeling processor 210 may be a hidden Markov model, a convolutional neural network, and the like. Acoustic modeling processor 210 may be implemented in hardware, software, or a combination of hardware and software.

The matching phenomes are then input into a language modeling processor 215 that implements a language modeling process that attempts to find the most plausible sequence of words that correspond to the detected phenomes according to common usage in a particular language. The language modeling processor 215 may utilize a language model that may comprise the possible n-grams that are to be detected and their probabilities—which in the case of the universal language model 220, may be quite large and extensive. The universal language model may contain all possible n-grams and their probabilities which can be large in the case of English. An n-gram is a contiguous sequence of words in a given corpus. The language modeling processor 215 may be implemented in hardware, software, or a combination of hardware and software.

The output of the language modeling processor 215 is one or more "n-bests" 225 which is a list of the top n predictions of a meaning for the acoustic speech data 205. These n-bests 225 may then be input to a second pass re-scorer 230. The second pass re-scorer 230 utilizes, for each of the n-bests 225, the acoustic speech data 205, scores for the acoustic modeling processor 210, and scores from the language modeling processor 215 to re-rank the predictions. From there, the top ranked n-best (as re-ranked by the second pass re-scorer 230) is acted upon at 235 and a response may be generated. For example, if the first n-best is asking about the weather, the system may provide the weather to the user at their location, such as by reading it to them. Second pass re-scorer 230 may be implemented in hardware, software, or a combination of hardware and software.

User input 240 may be collected in a variety of forms. For example, such user input may be collected if the user enters textual data, such as by utilizing a keyboard or touchscreen keyboard to enter a query, clicks on a provided link, or otherwise interacts with the results of the action. This data, along with other data, such as text search data 245 may be collected and logged.

The acoustic speech data 205, outputs of the acoustic modeling processor 210, outputs of the language modeling processor 215, the n-bests 225, the outputs of the second pass re-scorer 230, selected user inputs 240, and external signals, such as text search data 245 (e.g., any searches the user has done on textual search engines) may be logged in one or more logs 250. Error handler 255 may monitor the logs 250 of a particular user's session to determine if the error handler 255 should intervene. A session may be defined as a sequence of user interactions with a system that is terminated after a period of silence or inactivity. As noted, various signals may be utilized to determine when and whether to intervene. Example signals include repeated speech commands that produce similar n-bests, a text search after a speech command that is similar to the n-bests produced by the speech command, lack of interaction with the action or presented results, and/or the like. In some examples, the user may give an explicit signal, such as by inputting a command to the system that the speech recognition system is not interpreting their speech command properly. Error handler 255, including custom language model creator 275, clusterer 257, query matcher 265 and decision block 260 may be implemented in hardware, software, or a combination of hardware and software.

In some examples, the clusterer 257 of error handler 255 may first form clusters based upon similarities of the n-bests of a particular session of a user. As noted the cluster is formed from n-bests of the user's session and thus may have multiple sets of n-bests, each set of n-bests corresponding to a different instance of a voice command. The similarity may be measured both based upon textual similarities and phenome similarities. In some examples, the number of n-bests in the clusters, and/or the number of clusters may be utilized as a signal to determine whether a user has repeated a speech command. For example, a large number of n-bests in a query evidences a repeated command as it evidences that the user may have tried the command multiple times (and thus generated multiple sets of n-bests). In other examples, the clustering is done after a determination is made that intervention is necessary. For example, a similarity may be determined prior to the clustering.

An evaluation 260 is performed to determine if intervention is necessary and if it is not deemed necessary, then the system continues processing speech data normally. If intervention is deemed necessary, then query matcher 265 of the error handler 255 utilizes an index 270 to supplement the n-bests in one or more of the clusters (e.g., the cluster to which the n-bests of the present acoustic speech data 205 were assigned and thus which corresponds to the most recent speech command received from the user). The index 270 may be an index of historical queries issued to a search engine (e.g., Bing®, Google®, and the like). The index may be based upon previous searches on the search engine during a particular time period (e.g., the last year, the last 2 years, and so on).

The clusters may be supplemented by adding queries that are textually similar to the n-bests in the cluster. Similarity algorithms as used herein for clustering or for finding similar queries may include an edit distance algorithm that scores similarity of two input text values by determining how many character edits are needed to transform a first of the two input text values to the second of two input text values. The lower the score, the more similar the two input values are. In some examples, the index may be traversed to find n-grams that are similar to the n-grams in the n-bests and the corresponding queries at the index may be added to the cluster. The indexer matching may allow for sub-sequence matching (e.g., non-contiguous) and also matching that skips words. The retrieved queries may be ranked by an average click rate and the top predetermined number of queries may be added to the n-best predictions in the cluster.

The indexer matcher may surface recognition hypotheses which exist in the human vocabulary of phrases but are not popularly found in natural language corpora. An example is shown in Table 1. In this example, the user repeats the query "rule of five" several times, but this query is only recognized in the fourth attempt. The query cluster, for instance, may resemble:

TABLE 1

| Lexical Form of Query | Request Time | Lexical Form of Top N-Bests |
| --- | --- | --- |
| google of five | 1/23/2018 10:26:45 AM | google of five, rule of five, will of five |
| google of five | 1/23/2018 10:26:52 AM | google of five, rule of five, will of five, rulof five, you will of five, |
| google of five | 1/23/2018 10:26:59 AM | google of five, rule of five, google of five four, cool of five, google of five foot |
| rule of five | 1/23/2018 10:27:10 AM | Rule of five, rule of five, rulof five, newlove five, lulav five |

Though, "rule of five" has been a part of the top n-bests for all queries, it only surfaced up as the top n-best for the fourth query. For others, "rule of five" was always dominated by "google of five" which the language model deemed as more likely to be the correct hypothesis. But a quick look at the indexer output for the first query suggests that "rule of five" is indeed a popular hypothesis and can be surfaced up if the information from the indexer is combined with the existing n-bests:

Rule of five
What does the rule of five say
Jeannine made an insulting remark toward her husband according to the rule of five what does she . . . .
What does the rule of five say for every five compliments . . . .
The rule of five
As a rule the collective impact of competitive pressures associated with the five competitive forces
Lipinski's rule of five.
. . .

Using the n-bests alone, or supplemented by the queries, a custom language model 280 may be created for the cluster by custom language model creator 275 of error handler 255. For example, a set of n-grams for all the phrases in the n-bests and the queries along with their probabilities of occurrence in the corpus (the set of n-grams and queries) may be created. In some examples, this may be formatted as an ngram-format for ARPA backoff n-gram model (.arpa) developed by Doug Paul at MIT Lincoln Labs for research sponsored by the U.S. Department of Defense Advanced Research Project Agency. This may be compiled into a custom language model 280 in a format readable by the language modeling processor 215. One or more of the speech commands given in the session (e.g., a most recent speech command) may be re-run through the speech recognition processor, but this time, the custom language model 280 may be substituted for or applied in conjunction with the universal language model 220 in interpreting the output of the acoustic modeling component 210. This may produce a second set of n-bests 225 that is then re-scored by the second pass re-scorer 230 to produce a re-ranking of the n-bests and another action on the first ranked choice 235.

Figure 3:
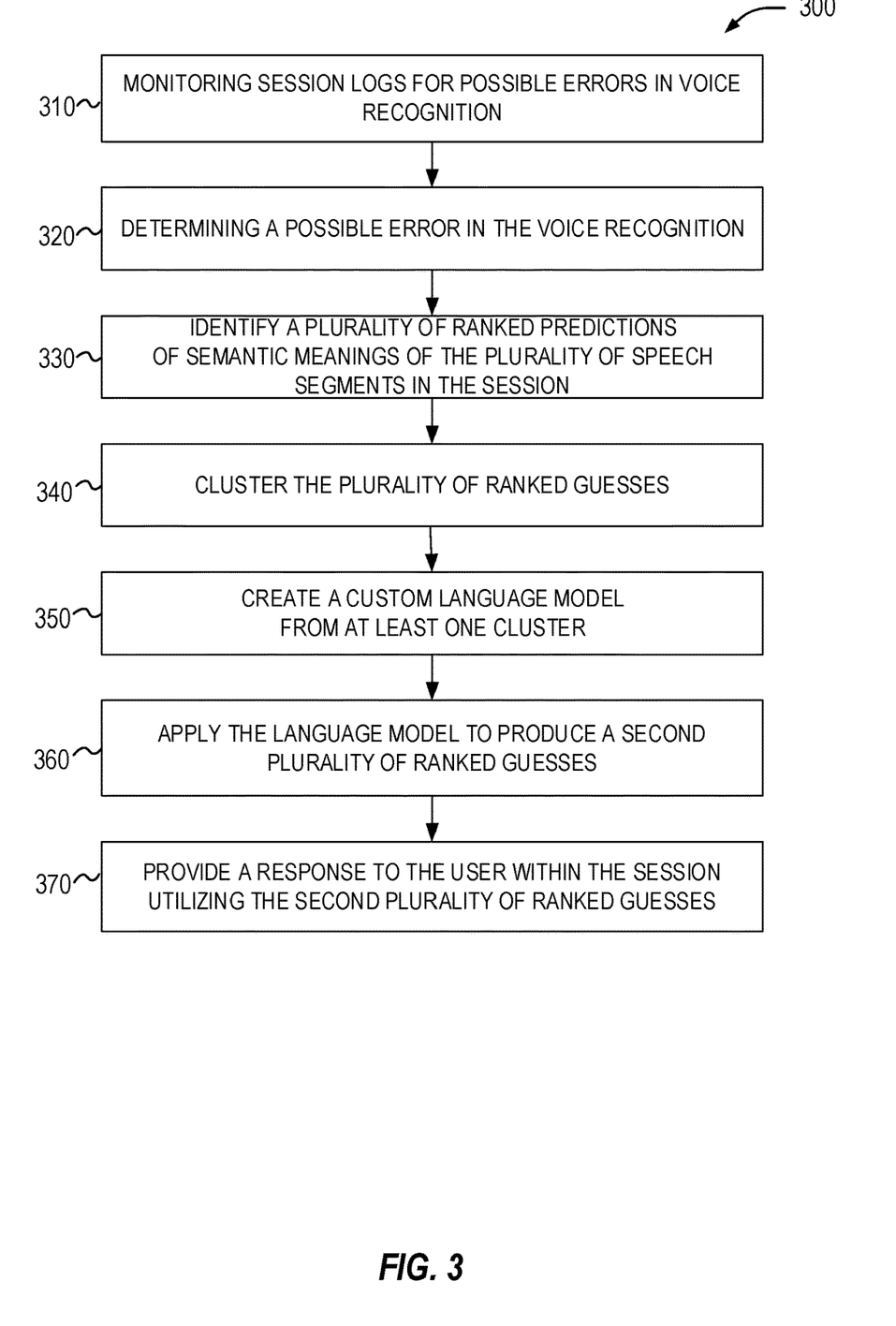
FIG. 3 illustrates a flowchart of a method for detecting and correcting computer-based voice recognition.

FIG. 3 illustrates a flowchart of a method 300 for detecting and correcting computer implemented speech recognition. At operation 310 the error detection component may monitor session logs of a speech session for signals of possible errors in speech recognition. For example, monitoring for repeated speech commands that produce similar n-bests within a short time frame. At operation 320, a possible error may be determined based upon the signals monitored at operation 310. At operation 330, the error detection component may identify a plurality of ranked predictions of meanings of the plurality of speech commands given by the user in the session. Identification may include loading them into memory from a log file or other storage, retrieving them from a network, searching for them, and the like. In some examples, the error detection component may gather the n-bests produced for all speech commands in a particular session. In other examples, the error detection component may only gather the n-bests produced for a subset (e.g., a most recent group) of the speech commands issued by the user in the particular session.

At operation 340 the error detection component may cluster the plurality of ranked guesses from the current user and the current session based upon text and metaphone distances. For example, each n-best may start in its own cluster. The clusters are then compared and if both the text based and metaphone-based distances are within predetermined thresholds, the clusters may be merged. This may be repeated until no more clusters can be merged.

At operation 350, a custom language model may be created from at least one of the clusters. For example, the largest cluster (which may represent the cluster that has the most incorrect queries) or the cluster with the n-bests most recently generated may be selected. This cluster may be supplemented by text-based queries. This custom language model may be smaller than an entire language model for an entire language or portion of a language. For example, the custom language model may be a "tiny" language model.

The custom language model may be specific to a user and/or specific to the session of the user. Additional details on creating the language model are described in FIG. 4.

At operation 360, at least one acoustic speech data segment that encodes at least one speech command from the session (e.g., the speech command that generated at least one of the n-bests in the cluster) may be reprocessed in the speech recognition processor 207 using the custom language model to produce a second plurality of ranked guesses. In some examples, the acoustic modeling processor 210, language modeling processor 215, and second pass re-scorer 230 may be re-run on the acoustic speech data segment. In other examples, the speech recognition processor 207 may partially reprocess the acoustic speech data segment (e.g., by utilizing the logs 250 or other intermediate data).

The second plurality of ranked guesses may be resubmitted to the second pass re-scorer for re-ranking. In some examples, the second plurality of ranked guesses may be combined with one or more of the first plurality of ranked guesses (e.g., the top 1-best of the first plurality) and fed to the second pass re-scorer for re-ranking. At operation 370, a response may be provided to the user by utilizing the second plurality of ranked guesses. For example, the top ranked guess in the second plurality of ranked guesses may be selected and an action may be executed based upon the top ranked guess. For example, a semantic meaning may be determined (e.g., by utilizing natural language processing algorithms) and an action identified and executed. The action may produce one or more results that may be returned and communicated to the user through a user interface (e.g., by reading it in a computerized voice, by displaying it on a display, and the like).

Figure 4:
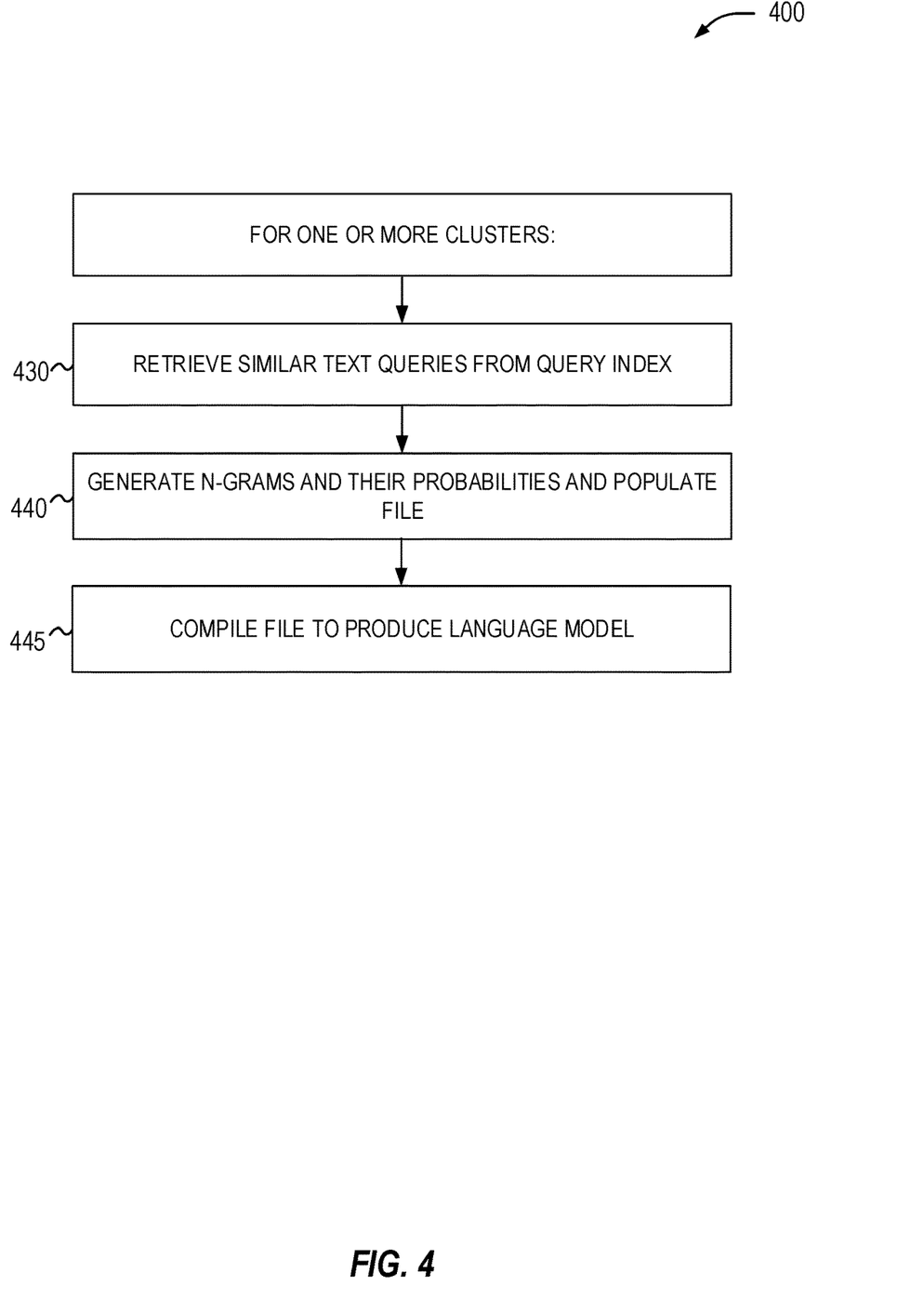
FIG. 4 illustrates a flowchart of a method for creating a custom language model according to some examples of the present disclosure.

FIG. 4 illustrates a flowchart of a method 400 for creating a custom language model according to some examples of the present disclosure. Method 400 is an example implementation of operation 350 of FIG. 3. Operations 430, 440, and 445 may be performed for one or more of the clusters. At operation 430 the error handler may retrieve similar text queries from a query index. In some examples, a query index may use one or more n-grams of the lexical form of the query terms as an index to the corresponding queries in which that n-gram appears. Queries that have n-grams that match, or are similar to, n-grams of the n-bests may be considered matches. As noted, for determining similarity, an edit distance algorithm may be employed and if the edit distance is less than a given threshold, the n-grams of the n-best may be considered as a match to an n-gram of the lexical form of a query term. The query results may be ranked based upon a frequency with which a top result in the search engine was clicked on.

At operation 440, the n-bests and the queries in the cluster are used to create a plurality of n-grams and the probabilities of occurrence of those n-grams are calculated and stored in a file. In some examples, this may be formatted as an ngram-format for ARPA backoff N-gram model. This may be compiled at operation 445 into a custom language model in a format readable by the language modeling component. For example, the custom language model may be a binary format of the language model, associated pronunciation information, and phonetic unit mappings.

FIG. 5 illustrates a diagram of creating a custom language model, according to some examples of the present disclosure. FIG. 5 may be performed in response to a particular voice recognition session, or may be performed at a later time. For example, FIG. 5 may be performed as a result of detecting a speech recognition error. At operation 510 the n-best data may be selected—for example, the data from a particular voice recognition session. This data is then used to produce n-best clusters at operation 515 and to find similar queries using index matching at operation 520. At operation 525 the combined outputs of at least one n-best cluster and the indexer matches 520 for that cluster (the matching queries) may be combined to form the custom language model grammar 525. This grammar is formatted into an N-gram model, such as the .arpa model format at operation 530. This n-gram model is then compiled into a custom language model at operation 535. The custom language model 535 may be fed back into the language processor at 540 along with the utterances (speech commands) that were in the cluster to produce a custom language model n-bests 545.

Figure 6:
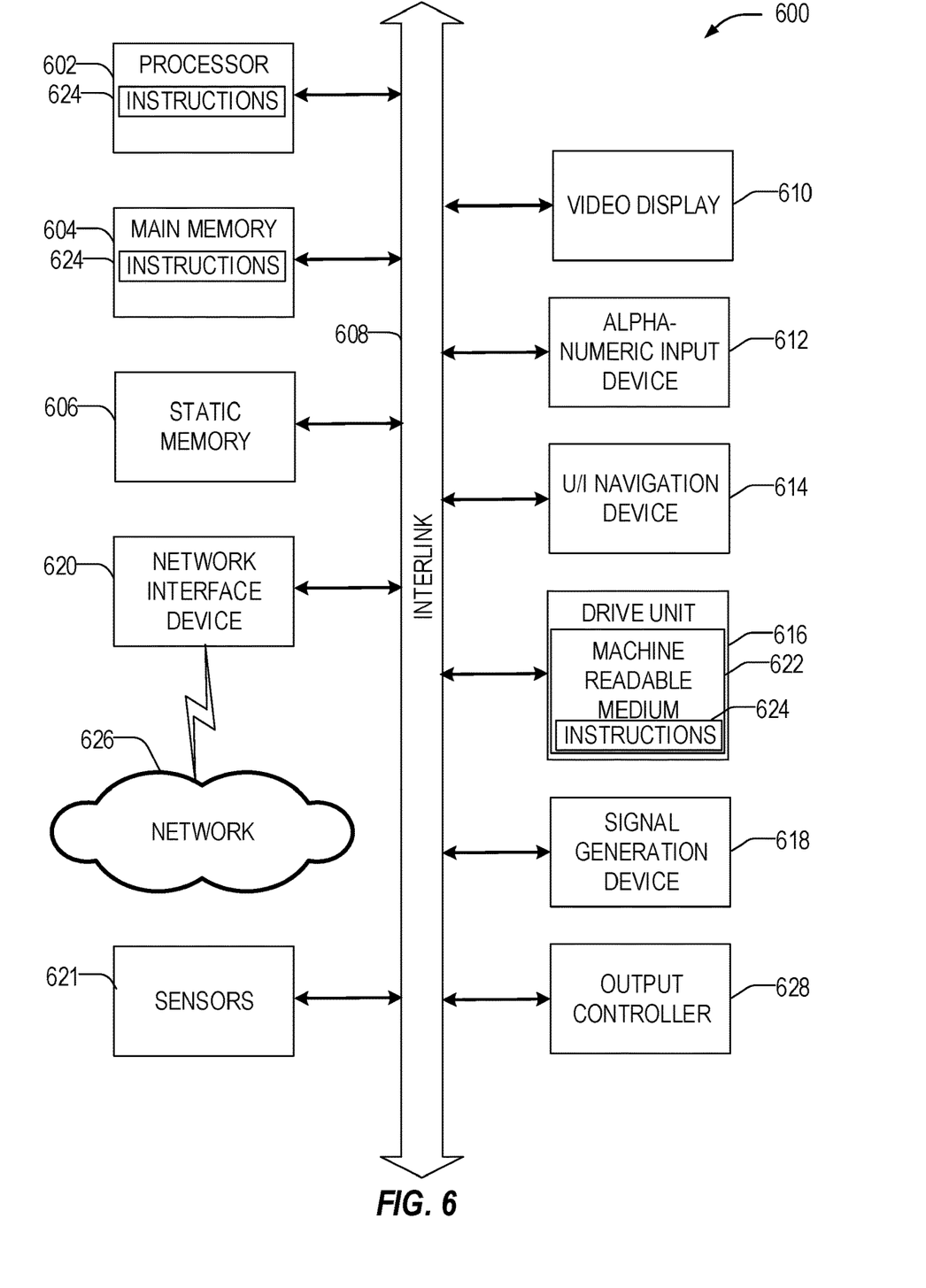
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 600 may implement one or more of first client computing device 105, second client computing device 110, first network server computing device 116, second network server computing device 120. Machine 600 may be configured to include a speech recognition processor, such as speech recognition processor 207, error handler 255, and other components. Machine 600 may implement methods 300, 400, and 500. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic or a number of components, modules, or mechanisms (hereinafter "modules"). For example, FIG. 1 and FIG. 2. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610 (shown as a video display), an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621. Example sensors 621 include one or more of a global positioning system (GPS) sensor, compass, accelerometer, temperature, light, camera, video camera, sensors of physical states or positions, pressure sensors, fingerprint sensors, retina scanners, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

OTHER NOTES AND EXAMPLES

Example 1 is a computing device for speech recognition, the computing device comprising: a computer processor; a memory device coupled to the computer processor and comprising instructions, which when performed by the computer processor, causes the computer processor to perform operations comprising: retrieving a plurality of ranked predictions of a meaning of one or more speech data segments, the one or more speech data segments provided for a particular session of a particular user of a speech recognition application; clustering the plurality of ranked predictions into one or more clusters based upon a similarity of the ranked predictions; creating a custom language model for at least one cluster of the one or more clusters based upon the ranked predictions in the at least one cluster; applying the custom language model in a language modeling process to produce a second plurality of ranked predictions of a meaning of at least one segment of the one or more speech data segments; and utilizing the second plurality of ranked predictions to cause a response to the particular user within the particular session.

In Example 2, the subject matter of Example 1 includes, wherein the operations further comprise: retrieving a query previously issued to a text-based search engine that is similar to at least one prediction in the ranked predictions in the at least one cluster; and including the query in the at least one cluster; wherein creating the custom language model for the at least one cluster based upon the ranked predictions comprises creating the custom language model for the at least one cluster based upon the ranked predictions in the at least one cluster and the query.

In Example 3, the subject matter of Example 2 includes, wherein the operations of retrieving the query comprises retrieving a top-ranked query from a plurality of matching queries, the plurality of matching queries being ranked based upon an average click rate.

In Example 4, the subject matter of Examples 1-3 includes, wherein the operations further comprise: monitoring the particular session as the session is ongoing; determining, based upon a presence of an error signal, that the speech recognition application incorrectly interpreted a speech command during the particular session; and wherein creating the custom language model, applying the custom language model in the language modeling process, and utilizing the second plurality of ranked predictions is performed responsive to determining that the speech recognition application did not properly understand the speech command.

In Example 5, the subject matter of Example 4 includes, wherein the error signal indicates a duplicated speech command.

In Example 6, the subject matter of Example 5 includes, wherein the operations of detecting the duplicated speech command comprise determining a similarity between first ranked predictions of a first speech command and second ranked predictions of a second speech command, the first ranked predictions and the second ranked predictions being part of the plurality of ranked predictions.

In Example 7, the subject matter of Examples 4-6 includes, wherein the error signal comprises a subsequent text-based command that is textually similar to a ranked prediction in the plurality of ranked predictions.

In Example 8, the subject matter of Examples 1-7 includes, wherein the custom language model is customized for the particular user and the particular session and is smaller than a universal language model used by the language modeling process.

Example 9 is a computer-implemented method of speech recognition, the method comprising, using one or more computer processors: retrieving a plurality of ranked predictions of a meaning of one or more speech data segments, the one or more speech data segments provided for a particular session of a particular user of a speech recognition application; clustering the plurality of ranked predictions into one or more clusters based upon a similarity of the ranked predictions; creating a custom language model for at least one cluster of the one or more clusters based upon the ranked predictions in the at least one cluster; applying the custom language model in a language modeling process to produce a second plurality of ranked predictions of a meaning of at least one segment of the one or more speech data segments; and utilizing the second plurality of ranked predictions to cause a response to the particular user within the particular session.

In Example 10, the subject matter of Example 9 includes, retrieving a query previously issued to a text-based search engine that is similar to at least one prediction in the ranked predictions in the at least one cluster; and including the query in the at least one cluster; wherein creating the custom language model for the at least one cluster based upon the ranked predictions comprises creating the custom language model for the at least one cluster based upon the ranked predictions in the at least one cluster and the query.

In Example 11, the subject matter of Example 10 includes, wherein retrieving the query comprises retrieving a top-ranked query from a plurality of matching queries, the plurality of matching queries being ranked based upon an average click rate.

In Example 12, the subject matter of Examples 9-11 includes, monitoring the particular session as the session is ongoing; determining, based upon a presence of an error signal, that the speech recognition application incorrectly interpreted a speech command during the particular session; and wherein creating the custom language model, applying the custom language model in the language modeling process, and utilizing the second plurality of ranked predictions is performed responsive to determining that the speech recognition application did not properly understand the speech command.

In Example 13, the subject matter of Example 12 includes, wherein the error signal indicates a duplicated speech command.

In Example 14, the subject matter of Example 13 includes, wherein the duplicated speech command is detected by determining a similarity between first ranked predictions of a first speech command and second ranked predictions of a second speech command, the first ranked predictions and the second ranked predictions being part of the plurality of ranked predictions.

In Example 15, the subject matter of Examples 12-14 includes, wherein the error signal comprises a subsequent text-based command that is textually similar to a ranked prediction in the plurality of ranked predictions.

In Example 16, the subject matter of Examples 9-15 includes, wherein the custom language model is customized for the particular user and the particular session and is smaller than a universal language model used by the language modeling process.

Example 17 is a machine-readable medium comprising instructions, which when performed by a machine, causes the machine to perform operations comprising: retrieving a plurality of ranked predictions of a meaning of one or more speech data segments, the one or more speech data segments provided for a particular session of a particular user of a speech recognition application; clustering the plurality of ranked predictions into one or more clusters based upon a similarity of the ranked predictions; creating a custom language model for at least one cluster of the one or more clusters based upon the ranked predictions in the at least one cluster; applying the custom language model in a language modeling process to produce a second plurality of ranked predictions of a meaning of at least one segment of the one or more speech data segments; and utilizing the second plurality of ranked predictions to cause a response to the particular user within the particular session.

In Example 18, the subject matter of Example 17 includes, wherein the operations further comprise: retrieving a query previously issued to a text-based search engine that is similar to at least one prediction in the ranked predictions in the at least one cluster; and including the query in the at least one cluster; wherein creating the custom language model for the at least one cluster based upon the ranked predictions comprises creating the custom language model for the at least one cluster based upon the ranked predictions in the at least one cluster and the query.

In Example 19, the subject matter of Example 18 includes, wherein the operations of retrieving the query comprises retrieving a top-ranked query from a plurality of matching queries, the plurality of matching queries being ranked based upon an average click rate.

In Example 20, the subject matter of Examples 17-19 includes, wherein the operations further comprise: monitoring the particular session as the session is ongoing; determining, based upon a presence of an error signal, that the speech recognition application incorrectly interpreted a speech command during the particular session; and wherein creating the custom language model, applying the custom language model in the language modeling process, and utilizing the second plurality of ranked predictions is performed responsive to determining that the speech recognition application did not properly understand the speech command.

In Example 21, the subject matter of Example 20 includes, wherein the error signal indicates a duplicated speech command.

In Example 22, the subject matter of Example 21 includes, wherein the operations of detecting the duplicated speech command comprise determining a similarity between first ranked predictions of a first speech command and second ranked predictions of a second speech command, the first ranked predictions and the second ranked predictions being part of the plurality of ranked predictions.

In Example 23, the subject matter of Examples 20-22 includes, wherein the error signal comprises a subsequent text-based command that is textually similar to a ranked prediction in the plurality of ranked predictions.

In Example 24, the subject matter of Examples 17-23 includes, wherein the custom language model is customized for the particular user and the particular session and is smaller than a universal language model used by the language modeling process.

Example 25 is a computing device for speech recognition, the computing device comprising: means for retrieving a plurality of ranked predictions of a meaning of one or more speech data segments, the one or more speech data segments provided for a particular session of a particular user of a speech recognition application; means for clustering the plurality of ranked predictions into one or more clusters based upon a similarity of the ranked predictions; means for creating a custom language model for at least one cluster of the one or more clusters based upon the ranked predictions in the at least one cluster; means for applying the custom language model in a language modeling process to produce a second plurality of ranked predictions of a meaning of at least one segment of the one or more speech data segments; and means for utilizing the second plurality of ranked predictions to cause a response to the particular user within the particular session.

In Example 26, the subject matter of Example 25 includes, means for retrieving a query previously issued to a text-based search engine that is similar to at least one prediction in the ranked predictions in the at least one cluster; and means for including the query in the at least one cluster; wherein the means for creating the custom language model for the at least one cluster based upon the ranked predictions comprises means for creating the custom language model for the at least one cluster based upon the ranked predictions in the at least one cluster and the query.

In Example 27, the subject matter of Example 26 includes, wherein the means for retrieving the query comprises means for retrieving a top-ranked query from a plurality of matching queries, the plurality of matching queries being ranked based upon an average click rate.

In Example 28, the subject matter of Examples 25-27 includes, means for monitoring the particular session as the session is ongoing; means for determining, based upon a presence of an error signal, that the speech recognition application incorrectly interpreted a speech command during the particular session; and wherein creating the custom language model, applying the custom language model in the language modeling process, and utilizing the second plurality of ranked predictions is performed responsive to determining that the speech recognition application did not properly understand the speech command.

In Example 29, the subject matter of Example 28 includes, wherein the error signal indicates a duplicated speech command.

In Example 30, the subject matter of Example 29 includes, wherein the duplicated speech command is detected by determining a similarity between first ranked predictions of a first speech command and second ranked predictions of a second speech command, the first ranked predictions and the second ranked predictions being part of the plurality of ranked predictions.

In Example 31, the subject matter of Examples 28-30 includes, wherein the error signal comprises a subsequent text-based command that is textually similar to a ranked prediction in the plurality of ranked predictions.

In Example 32, the subject matter of Examples 25-31 includes, wherein the custom language model is customized for the particular user and the particular session and is smaller than a universal language model used by the language modeling process.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

What is claimed is:

1. A computing device for speech recognition, the computing device comprising:
 a computer processor;
 a memory device coupled to the computer processor and comprising instructions, which when performed by the computer processor, causes the computer processor to perform operations comprising:
 retrieving a plurality of ranked predictions of a meaning of one or more speech data segments, the one or more speech data segments provided for a particular session of a particular user of a speech recognition application;
 clustering the plurality of ranked predictions into one or more clusters based upon a similarity of the ranked predictions;
 creating a custom language model for at least one cluster of the one or more clusters based upon the ranked predictions in the at least one cluster;
 applying the custom language model in a language modeling process to produce a second plurality of ranked predictions of a meaning of at least one segment of the one or more speech data segments; and
 utilizing the second plurality of ranked predictions to cause a response to the particular user within the particular session.

2. The computing device of claim 1, wherein the operations further comprise:
 retrieving a query previously issued to a text-based search engine that is similar to at least one prediction in the ranked predictions in the at least one cluster; and
 including the query in the at least one cluster;
 wherein creating the custom language model for the at least one cluster based upon the ranked predictions comprises creating the custom language model for the at least one cluster based upon the ranked predictions in the at least one cluster and the query.

3. The computing device of claim 2, wherein the operations of retrieving the que comprises retrieving a top-ranked query from a plurality of matching queries, the plurality of matching queries being ranked based upon an average click rate.

4. The computing device of claim 1, wherein the operations further comprise:
 monitoring the particular session as the session is ongoing;
 determining, based upon a presence of an error signal, that the speech recognition application incorrectly interpreted a speech command during the particular session; and
 wherein creating the custom language model, applying the custom language model in the language modeling process, and utilizing the second plurality of ranked predictions is performed responsive to determining that the speech recognition application did not properly understand the speech command.

5. The computing device of claim 4, wherein the error signal indicates a duplicated speech command.

6. The computing device of claim 5, wherein the operations of detecting the duplicated speech command comprise determining a similarity between first ranked predictions of a first speech command and second ranked predictions of a second speech command, the first ranked predictions and the second ranked predictions being part of the plurality of ranked predictions.

7. The computing device of claim 4, wherein the error signal comprises a subsequent text-based command that is textually similar to a ranked prediction in the plurality of ranked predictions.

8. The computing device of claim 1, wherein the custom language model is customized for the particular user and the particular session and is smaller than a universal language model used by the language modeling process.

9. A computer-implemented method of speech recognition, the method comprising, using one or more computer processors:

retrieving a plurality of ranked predictions of a meaning of one or more speech data segments, the one or more speech data segments provided for a particular session of a particular user of a speech recognition application;

clustering the plurality of ranked predictions into one or more clusters based upon a similarity of the ranked predictions;

creating a custom language model for at least one cluster of the one or more clusters based upon the ranked predictions in the at least one cluster;

applying the custom language model in a language modeling process to produce a second plurality of ranked predictions of a meaning of at least one segment of the one or more speech data segments; and utilizing the second plurality of ranked predictions to cause a response to the particular user within the particular session.

10. The method of claim 9, comprising:

retrieving a query previously issued to a text-based search engine that is similar to at least one prediction in the ranked predictions in the at least one cluster; and including the query in the at least one cluster;

wherein creating the custom language model for the at least one cluster based upon the ranked predictions comprises creating the custom language model for the at least one cluster based upon the ranked predictions in the at least one cluster and the query.

11. The method of claim 10, wherein retrieving the query comprises retrieving a top-ranked query from a plurality of matching queries, the plurality of matching queries being ranked based upon an average click rate.

12. The method of claim 9, comprising:

monitoring the particular session as the session is ongoing;

determining; based upon a presence of an error signal, that the speech recognition application incorrectly interpreted a speech command during the particular session; and wherein creating the custom language model, applying the custom language model in the language modeling process, and utilizing the second plurality of ranked predictions is performed responsive to determining that the speech recognition application did not properly understand the speech command.

13. The method of claim 12, wherein the error signal indicates a duplicated speech command.

14. The method of claim 13, wherein the duplicated speech command is detected by determining a similarity between first ranked predictions of a first speech command and second ranked predictions of a second speech command, the first ranked predictions and the second ranked predictions being part of the plurality of ranked predictions.

15. The method of claim 12, wherein the error signal comprises a subsequent text-based command that is textually similar to a ranked prediction in the plurality of ranked predictions.

16. The method of claim 9, wherein the custom language model is customized for the particular user and the particular session and is smaller than a universal language model used by the language modeling process.

17. A machine-readable medium comprising instructions, which when performed by a machine, causes the machine to perform operations comprising:

retrieving a plurality of ranked predictions of a meaning of one or more speech data segments, the one or more speech data segments provided for a particular session of a particular user of a speech recognition application;

clustering the plurality of ranked predictions into one or more clusters based upon a similarity of the ranked predictions;

creating a custom language model for at least one cluster of the ons:or more clusters based upon the ranked predictions in the at least one cluster;

applying the custom language model in a language modeling process to produce a second plurality of ranked predictions of a meaning of at least one segment of the one or more speech data segments; and utilizing the second plurality of ranked predictions to cause a response to the particular user within the particular session.

18. The machine-readable medium of claim 17, wherein the operations further comprise:

retrieving a query previously issued to a text-based search engine that is similar to at least one prediction in the ranked predictions in the at least one cluster; and including the query in the at least one cluster;

wherein creating the custom language model for the at least one cluster based upon the ranked predictions comprises creating the custom language model for the at least one cluster based upon the ranked predictions in the at least one cluster and the query.

19. The machine-readable medium of claim 18, wherein the operations of retrieving the query comprises retrieving a top-ranked query from a plurality of matching queries, the plurality of matching queries being ranked based upon an average click rate.

20. The machine-readable medium of claim 17, wherein the operations further comprise:

monitoring the particular session as the session is ongoing;

determining, based upon a presence of an error signal, that the speech recognition application incorrectly interpreted a speech command during the particular session; and wherein creating the custom language model, applying the custom language model in the language modeling process, and utilizing the second plurality of ranked predictions is performed responsive to determining that the speech recognition application did not properly understand the speech command.

* * * * *